US010289282B2

(12) United States Patent
Wong et al.

(10) Patent No.: US 10,289,282 B2
(45) Date of Patent: May 14, 2019

(54) WHILE YOU WERE AWAY EXPERIENCE

(71) Applicant: Microsoft Technology Licensing, LLC, Redmond, WA (US)

(72) Inventors: Candy Hoi Mei Wong, Cambridge, MA (US); Benjamin G. Wilde, Quincy, MA (US); Manoj Sharma, Winchester, MA (US); Douglas L. Milvaney, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 14/977,168

(22) Filed: Dec. 21, 2015

(65) Prior Publication Data

US 2017/0177182 A1 Jun. 22, 2017

(51) Int. Cl.
*G06F 3/0484* (2013.01)
*H04L 29/08* (2006.01)
*H04L 29/06* (2006.01)
*G06Q 10/10* (2012.01)

(52) U.S. Cl.
CPC ........... *G06F 3/0484* (2013.01); *G06Q 10/10* (2013.01); *G06Q 10/101* (2013.01); *H04L 67/06* (2013.01); *H04L 67/22* (2013.01); *H04L 67/42* (2013.01)

(58) Field of Classification Search
CPC ....... G06F 3/0484; H04L 67/06; H04L 67/22; H04L 67/42
See application file for complete search history.

(56) References Cited

U.S. PATENT DOCUMENTS

| 7,107,307 | B1 | 9/2006 | Takishita |
| 7,568,151 | B2 | 7/2009 | Bargeron et al. |
| 7,937,663 | B2 | 5/2011 | Parker et al. |
| 7,962,853 | B2 | 6/2011 | Bedi et al. |
| 8,453,052 | B1 | 5/2013 | Newman et al. |
| 8,510,646 | B1 | 8/2013 | Young et al. |
| 8,655,950 | B2 | 2/2014 | Scherpa et al. |

(Continued)

FOREIGN PATENT DOCUMENTS

EP 2212807 B1 11/2017

OTHER PUBLICATIONS

"International Search Report and Written Opinion Issued in PCT Application No. PCT/US2016/066424", dated Feb. 7, 2017, 11 Pages.

(Continued)

*Primary Examiner* — Mandrita Brahmachari

(57) ABSTRACT

Aspects of the present disclosure relate to systems and methods for creating a file activity feed for display on a user interface of a client computing device. In one aspect, data comprising a plurality of activities associated with a file may be obtained. A timestamp associated with a user identity of the file may be identified. One or more missed activities (e.g., those that occurred since a user was away from the file) may be identified from the plurality of activities based on the identified timestamp. It may be determined which missed activities of the one or more missed activities are relevant to a user associated with the user identity. The one or more missed activities determined to be relevant to the user associated with the user identity may be displayed within the file activity feed on the user interface of the client computing device.

20 Claims, 6 Drawing Sheets

(56) References Cited

U.S. PATENT DOCUMENTS

| | | |
|---|---|---|
| 9,053,079 B2 | 6/2015 | Bailor et al. |
| 2006/0168510 A1* | 7/2006 | Bryar ............ G06F 17/212 715/229 |
| 2009/0249224 A1 | 10/2009 | Davis et al. |
| 2010/0131836 A1 | 5/2010 | Dukhon et al. |
| 2013/0073989 A1* | 3/2013 | Harris ............ G06Q 10/10 715/758 |
| 2013/0212250 A1 | 8/2013 | Kleppner et al. |
| 2014/0082525 A1* | 3/2014 | Kass ............ H04L 65/403 715/753 |
| 2014/0136995 A1* | 5/2014 | Matas ............ G06F 3/0481 715/753 |
| 2014/0229880 A1* | 8/2014 | Aradhye ............ G06F 17/3053 715/771 |
| 2014/0243097 A1 | 8/2014 | Yong et al. |
| 2014/0281870 A1 | 9/2014 | Vogel et al. |
| 2014/0289645 A1 | 9/2014 | Megiddo et al. |
| 2014/0298207 A1 | 10/2014 | Ittah et al. |
| 2015/0081674 A1* | 3/2015 | Ali ............ G06F 17/30991 707/722 |
| 2015/0215243 A1 | 7/2015 | Xu et al. |
| 2015/0242091 A1 | 8/2015 | Lu et al. |
| 2015/0261411 A1 | 9/2015 | Snook et al. |
| 2017/0003835 A1 | 1/2017 | Shaffer et al. |

OTHER PUBLICATIONS

Brush, et al., "Notification for Shared Annotation of Digital Documents", In Proceedings of the SIGCHI Conference on Human Factors in Computing Systems, vol. 4, Issue No. 1, Apr. 20, 2002, pp. 89-96.

Leland, et al., "Collaborative document production using quilt", In Proceedings of the ACM conference on Computer-supported cooperative work, Sep. 26, 1988, pp. 206-215.

"Document Sharing and Collaboration", Retrieved on: Sep. 4, 2015 Available at: https://www.zoho.com/docs/help/document-sharing-collaboration.html#configure-notification.

Weng, et al., "Asynchronous Collaborative Writing through Annotations", In Proceedings of the ACM conference on Computer supported cooperative work, vol. 6, Issue 3, Nov. 6, 2004, pp. 578-581.

Shen, et al., "Flexible Notification for Collaborative Systems", In Proceedings of the ACM conference on Computer supported cooperative work, Nov. 16, 2002, pp. 77-86.

"Collaboration", Retrieved From: https://www.zoho.com/writer/help/document-collaboration.html#Lock_Content, Retrieved Date: May 9, 2018, 11 Pages.

Goldsmith, Steve, "Introducing Stride", Retrieved From: https://www.atlassian.com/blog/announcements/introducing-stride, Sep. 7, 2017, 9 Pages.

\* cited by examiner

WHILE YOU WERE AWAY EXPERIENCE

BACKGROUND

Computer and software users have grown accustomed to user-friendly software applications for co-authoring files, documents, messages, and the like. For example, storage providers (e.g., cloud storage providers) provide applications such as word processing applications, spreadsheet applications, electronic slide presentation applications, email applications, chat applications, voice applications, and the like, where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include presenting content changes next to the document canvas while users are synchronously in an application. Additionally, the content changes are shown in the document canvas. As such, current techniques for apprising users of content changes result in an overwhelming amount of data that is distracting, duplicated, cluttered, and difficult to parse. In turn, current techniques for informing users of content changes in applications are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for creating a file activity feed for display on a user interface of a client computing device. In one aspect, data comprising a plurality of activities associated with a file may be obtained. A timestamp associated with a user identity of the file may be identified. One or more missed activities (e.g., activities that occurred since a user last accessed or viewed the file) may be identified from the plurality of activities based on the identified timestamp. It may be determined which missed activities of the one or more missed activities are relevant to a user associated with the user identity. The one or more missed activities determined to be relevant to the user associated with the user identity may be displayed within the file activity feed on the user interface of the client computing device.

In another aspect, data comprising a plurality of activities associated with a file may be obtained. A timestamp associated with a user identity of the file may be identified. One or more missed activities may be identified from the plurality of activities based on the identified timestamp. It may be determined which missed activities of the one or more missed activities explicitly reference a user associated with the user identity. In another example, it may be determined which missed activities of the one or more missed activities are indicated as relevant in one or more user preferences associated with the user identity. The one or more missed activities determined to explicitly reference the user associated with the user identity and indicated as relevant in one or more user preferences associated with the user identity may be displayed within the file activity feed on the user interface of the client computing device.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
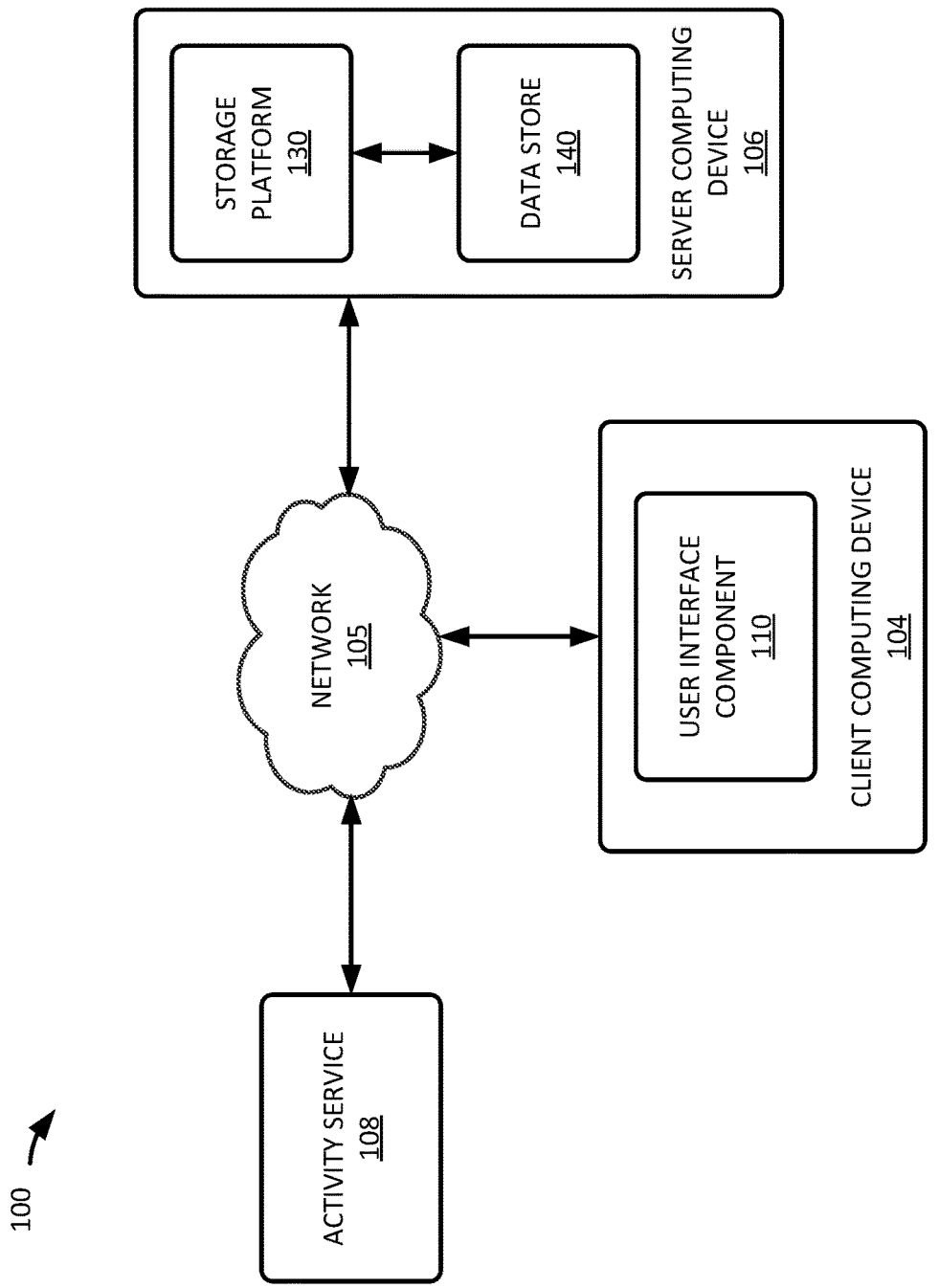
FIG. 1 illustrates an exemplary file activity system for creating a file activity feed, according to an example aspect.

Aspects of the disclosure are generally directed to creating a file activity feed for display on a user interface of a client computing device. For example, the file activity feed may include a proactive while you were away file experience. In one aspect, the file activity feed may organize activities related to a file associated with an application and activities related to a file associated with an application. In some examples, the activities related to the file may include activities such as content changes in the file (e.g., edits and deletions), sharing the file, renaming the file, comments within the file, messaging, and the like. In some examples, the activities that surround the file may include activities such as conversations around the document (e.g., email communications and/or messaging communications that discuss and/or reference the file), and the like. In one aspect, data comprising a plurality of activities associated with a file may be obtained. The file activity feed may determine whether the plurality of activities associated with the file include one or more missed activities. For example, the one or more missed activities may include those activities that have occurred while a user/co-author of a file has been away from the file. In some examples, a user may be away from a file when the file is closed for a period of time, while in other examples, a user may be away from a file when the file is out of focus on the user's computer screen, the user's computer is idle or asleep, etc. As such, in one example, determining whether the plurality of activities associated with the file include one or more missed activities may include identifying a timestamp associated with a user identity of the file. The timestamp may include a time associated with a user/co-author being away from the file. For example, the timestamp may include at least one of a last view time of the file, a last edit time of the file, a last time entering the file activity feed, a last time exiting the file activity feed, and a last file close time.

In some cases, when it is determined that the plurality of activities associated with the file include one or more missed activities, it may be determined which missed activities of the one or more missed activities are relevant to a user associated with the user identity. The one or more missed activities determined to be relevant to the user associated with the user identity may be displayed within the file activity feed on the user interface of the client computing device. In this regard, the while you were away experience is directly targeted at helping users quickly get caught up with relevant changes and/or activities that have happened to and/or around a file while they were away. In turn, users and/or co-authors collaborating within documents may be provided with context for knowing what happened to the document while they were away and any actions they may need to take in view of what happened while they were away.

As discussed above, as more users share, co-author, and collaborate on applications it becomes increasingly difficult for users to stay apprised of changes to the documents created in these applications, whether users are in or away from the applications. Current techniques for solving this problem include presenting content changes next to the document canvas while users are synchronously in an application. Additionally, the content changes are shown in the document canvas. As such, current techniques for apprising users of content changes result in an overwhelming amount of data that is distracting, duplicated, cluttered, and difficult to parse. In turn, current techniques for informing users of content changes in documents are inefficient and inadequate. Accordingly, aspects described herein include determining when activities have been missed and which of those missed activities are relevant to a user/co-author of a file. In this regard, data comprising a plurality of activities associated with a file may be obtained. The file activity feed may determine whether the plurality of activities associated with the file include one or more missed activities. When it is determined that the plurality of activities associated with the file include one or more missed activities, it may be determined which missed activities of the one or more missed activities are relevant to a user associated with the user identity. The one or more missed activities determined to be relevant to the user associated with the user identity may be displayed within the file activity feed on the user interface of the client computing device. For example, a different file activity feed may be created for each user/co-author of the file. In this regard, the file activity feed may include only those activities that are relevant to a particular user/co-author. By only displaying those activities that are relevant to a user/co-author and that have occurred since the user/co-author was away from the file, the file activity feed remains free from clutter, an overwhelming amount of data, and repetition, while facilitating an optimized experience for users and/or co-authors to catch up with activities that are relevant and/or important to the user and that have occurred while they were away from the file. A technical effect that may be appreciated is that the activities are organized and displayed within the file activity feed in a clear, understandable, and functional surface so that a user may quickly and efficiently identify what happened to the document while they were away and any actions they may need to take in view of what happened while they were away. In turn, collaboration on documents may be accomplished in a faster and/or more efficient manner, ultimately reducing processor load, conserving memory, and reducing network bandwidth usage.

Further aspects described herein include prioritizing the missed activities determined to be relevant to a user/co-author of a file for display within the file activity feed. For example, an order for displaying, within the file activity feed, one or more missed activities determined to be relevant to a user/co-author of a file may be determined. The order may be determined by assigning a priority level to the one or more missed activities. For example, the priority level may be assigned to the one or more missed activities based on one or more user preferences associated with the user identity. For example, a user may set a user preference to include notifying the user of all activities specifically directed to the user. In this regard, those activities specifically directed to the user may be determined to be relevant and may be assigned a high priority level. In another example, the priority level may be assigned to the one or more missed activities based on a history of one or more missed activities identified as relevant to the user associated with the user identity. For example, over time, types of activities that are most important and/or relevant to a particular user or group of users may be learned. In this regard, the types of activities that have been determined over time to be the most important and/or relevant to a particular user or group of users may be assigned a high priority level. In another example, the priority level may be assigned to the one or more missed activities based on whether the one or more missed activities explicitly or implicitly reference the user associated with the user identity. For example, a high priority level may be assigned to activities that explicitly reference the user associated with the user identity. In one case, the one or more missed activities that are assigned a high priority level may be displayed in a featured position within the file activity feed (e.g., may be first in the order of the one or more missed activities). Accordingly, another technical effect that may be appreciated is that the while you were away experience facilitates a compelling visual and functional experience to allow users and/or co-authors of a file to efficiently interact with a user interface to quickly, easily, and efficiently view those activities that are most relevant to them and take any actions necessary in view of what happened while they were away.

Referring now to the drawings, in which like numerals represent like elements through the several figures, aspects of the present disclosure and the exemplary operating environment will be described. With reference to FIG. 1, one aspect of a file activity system 100 for creating a file activity feed and/or a while you were away experience for display on a user interface of a client computing device is illustrated. The file activity system 100 may include a client computing device 104, a server computing device 106, and an activity service 108. In aspects, the file activity system 100 may be implemented on the client computing device 104. In a basic configuration, the client computing device 104 is a handheld computer having both input elements and output elements. The client computing device 104 may be any suitable computing device for implementing the file activity system 100 for creating a file activity feed and/or a while you were away experience for display on a user interface of a client computing device. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; etc. This list is exemplary only and should not be considered as limiting. Any suitable client computing device 104 for implementing the file activity system 100 for creating a file activity feed and/or while you were away experience for display on a user interface of a client computing device may be utilized.

In aspects, the file activity system 100 may be implemented on the server computing device 106. The server computing device 106 may provide data to and from the client computing device 104 through a network 105. In aspects, the file activity system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, emoji reactions may be extended into file specific content of one or more information processing applications.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the file activity system 100 may include the client computing device 104, the server computing device 106, and the activity service 108. The various components may be implemented using hardware, software, or a combination of hardware and software. In aspects, the client computing device 104 may include a user interface component 110. The user interface component 110 may be configured to create and display a file activity feed on a user interface of the client computing device 104. In this regard, the user interface component 110 may be configured to display a file created with an application, where the file includes a file activity feed including a plurality of activities. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation.

In another example, the user interface component 110 and/or the file displayed on the user interface may obtain data comprising a plurality of activities associated with the file. In one example, the one or more activities may include both client side activities and server side activities. For example, the one or more activities may include activities associated with the client computing device 104 and activities associated with the server computing device 106. In one example, the plurality of activities may include content changes, communication activities, document content exchanges, permission requests, sharing, printing, and the like. In aspects, the server computing device 106 is unaware of the plurality of activities associated with the client computing device 104 and the client computing device 104 is unaware of the plurality of activities associated with the server computing device 106. In one example, the plurality of activities associated with the client computing device 104 may include messages, communication activities such as Instant Messaging and/or voice communications, comments, email activities, presentation of the file, printing the file, co-authoring the file, and the like. In one case, email activities may include sending an email, printing an email, and the like. In one example, the one or more activities associated with the server computing device 106 may include receiving a shared file, renaming a file, sharing a file, editing a file, restoring a file, and the like.

In aspects, the one or more activities may include corresponding activity metadata. In one case, the activity metadata may include at least a user identity, an activity timestamp, a type of activity, a location, and a link. In one case, the user identity may be an identifier of a user and/or co-author of the file. In one example, the user identity may indicate the user and/or co-author who performed an activity. In another example, the user identity may indicate a recipient of an activity. In one example, the activity timestamp may indicate a time at which the activity was performed. In another example, the activity timestamp may indicate an amount of time that has passed since an activity was performed. The type of activity may indicate the type of activity that occurred relative to the file such as any of the activities described herein. In one example, the location may indicate where the activity is located within a file and/or relative to a file. In one case, the link may provide access to the file associated with the activity. For example, if the activity is an email activity and user/co-author is in an email application, upon receiving a selection of the link, the user/co-author may access the file associated with the email activity.

In aspects, the user interface component 110 may determine whether the plurality of activities associated with the file include one or more missed activities. The one or more missed activities may include those activities described herein that have occurred while a user and/or co-author is away from the file. In one case, determining whether the plurality of activities associated with the file include one or more missed activities comprises at least identifying a timestamp associated with the user identity of the file. In one example, the timestamp includes at least one of a last view time, a last edit time, a last time entering the file activity feed, a last time exiting the file activity feed, and a last close time. In one case, the last view time may be a last view time in the file. For example, the last view time may include the last time a user associated with the user identity opened and viewed the file. In one case, the last edit time may be a last edit time in the file. For example, the last edit time may include the last time a user associated with the user identity edited the file. In one example, the last time entering the file activity feed may include the last time at which a user associated with the user identity opened the file activity feed. In another example, the last time entering the file activity feed may include the last time at which a user associated with the user identity viewed the file activity feed. In one example, the last time exiting the file activity feed may include the last time at which a user associated with the user identity closed the file activity feed. In one case, the last close time may be a file last close time. For example, the last close time may include the last time a user associated with the user identity closed the file. The timestamp as described herein may include a date and/or time. For example, the last close time may include the date and time that a user associated with the user identity closed the file.

In some aspects, when it is determined that the plurality of activities associated with the file include one or more missed activities, the user interface component 110 may determine which missed activities of the one or more missed activities are relevant to a user associated with a user identity of the file. In one example, determining which missed activities of the one or more missed activities are relevant to the user associated with the user identity includes identifying one or more missed activities that explicitly reference the user associated with the user identity. In one example, the one or more missed activities that explicitly reference the user associated with the user identity may include activities such as comments, @mentions, chats, emails, messages, and the like. In some cases, the one or more missed activities that explicitly reference the user associated with the user identity may be directed to the user associated with the user identity. For example, a relevant missed activity may include a second co-author's comment on content drafted by a first co-author, e.g., via a direct mention of the first co-author in the comment using a @mention (e.g., @ the first co-author's name). In other cases, the one or more missed activities that explicitly reference the user associated with the user identity may include activities in response to activities created by the user associated with the user identity. For example, a relevant missed activity may include a second co-author's response to a comment created by a first co-author. In yet other cases, the one or more missed activities that explicitly reference the user associated with the user identity may include reactions to activities created by the user associated with the user identity. For example, the one or more missed activities may include emoji. In this regard, a relevant missed activity may include a second co-author's in-line use of an emoji reaction to an activity created by a first co-author.

In another example, determining which missed activities of the one or more missed activities are relevant to the user associated with the user identity includes identifying one or more missed activities that implicitly reference the user associated with the user identity. In one example, the one or more missed activities that implicitly reference the user associated with the user identity include activities that occurred on content created by the user associated with the user identity. For example, a relevant missed activity may include a second co-author's comment on content created by a first co-author (e.g., the user associated with the user identity). In another example, the one or more missed activities that implicitly reference the user associated with the user identity include activities that occurred on content involving the user associated with the user identity. For example, a relevant missed activity may include a second co-author's edits to content created by a first co-author (e.g., the user associated with the user identity).

In yet another example, determining which missed activities of the one or more missed activities are relevant to the user associated with the user identity comprises identifying one or more missed activities indicated as relevant in one or more user preferences associated with the user identity. In some cases, the one or more user preferences may include at least one of activity type notifications and/or a notification frequency. The activity type notifications may include the type of activities the user prefers to be notified about. For example, a user associated with the user identity may prefer to be notified for missed activities of the type comments, @mentions, and edits. In this regard, comments, @mentions, and edits are indicated as relevant in the one or more user preferences. As such, when a co-author of the file comments on content created by the user associated with the user identity, @mentions the user associated with the user identity, or edits content created by the user associated with the user identity, it is determined that these missed activities are relevant to the user associated with the user identity. The notification frequency may include the frequency at which the user associated with the user identity prefers to be notified. For example, a user may prefer to be notified about edits to content created by the user, but may not want to be notified every time an edit is made to content created by the user. In this regard, the user may set the notification frequency accordingly. In one example, a user may set the notification frequency to a particular amount of time. For example, the user may prefer to be notified with missed activities that have occurred within a particular amount of time (e.g., one hour, one day) from the timestamp (e.g., last view time, last edit time,) associated with the user identity of the file. In another example, a user may set the notification frequency to a particular number. For example, the user may prefer to be notified with a particular number of missed activities from the total number of missed activities. In one example, the user may set the particular notification frequency number to 50% (e.g., to receive notification of half of the total missed activities).

In some aspects, the user interface component 110 may display the one or more missed activities determined to be relevant to the user associated with the user identity within the file activity feed on the user interface of the client computing device. In one case, displaying the one or more missed activities determined to be relevant to the user associated with the user identity comprises determining an order for displaying the one or more missed activities within the file activity feed. For example, the one or more missed activities may be ordered within the file activity feed from a most favored (e.g., top) position to a least favored (e.g., bottom) position based on priority. In this regard, a priority level may be assigned to the one or more missed activities. In one case, the priority level may indicate at which position in the file activity feed the one or more activities are displayed. For example, when a high priority level is assigned to a missed activity, the missed activity may be displayed in a more favored position (e.g., a top or high position) within the file activity feed. In another example, when a low priority level is assigned to a missed activity, the missed activity may be displayed in a less favored position (e.g., a bottom or low position) within the file activity feed.

In one case, the priority level is assigned to the one or more missed activities based on one or more user preferences associated with the user identity. For example, as discussed above, a user may set a preference for receiving notifications based on a type of activity. When a preference is set for receiving a notification of a missed activity of a particular type, this particular type of activity may be assigned a high priority level. In another case, the priority level is assigned to the one or more missed activities based on a history of one or more missed activities identified as relevant to the user associated with the user identity. For example, the file activity system 100 may learn (e.g., overtime) the type of missed activities that are most important and/or relevant to a particular user or group of users. In yet another case, the priority level is assigned to the one or more missed activities based on a combination of one or more user preferences associated with the user identity and a history of one or more missed activities identified as relevant to the user associated with the user identity. In one example, a higher priority level is assigned to the one or more missed activities based on the one or more user preferences than based on the history of the one or more activities. In another example, a highest priority level may be assigned to one or more missed activities that are included in the one or more user preferences and identified as relevant in the history of the one or more missed activities. In another example, the priority level may be assigned to the one or more missed activities based on whether the one or more missed activities explicitly or implicitly reference the user associated with the user identity. For example, a higher priority level may be assigned to activities that explicitly reference the user associated with the user identity than activities that implicitly reference the user associated with the user identity. In one example, a highest priority level may be assigned to the missed activities directed to the user associated with the user identity.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the client computing device 104 and/or the user interface component 110 may obtain the plurality of activities from one or more sources. For example, the client computing device 104 and/or the user interface component 110 may obtain the plurality of activities from the server computing device 106. The server computing device 106 may include a storage platform 130 and the data store 140. In this regard, the client computing device 104 and/or the user interface component 110 may obtain the plurality of activities from at least the storage platform 130 and the data store 140. In one example, the storage platform 130 may be configured to store, manage, and access data and/or information associated with the file activity system 100. For example, the storage platform 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage platform 130. In another example, data store 140 may be a separate component and/or may be located separate from the storage platform 130. It is appreciated that although one server computing device 106 is illustrated in FIG. 1, the file activity system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In another case, the client computing device 104 and/or the user interface component 110 may obtain the one or more activities from the activity service 108. The activity service 108 may be configured to receive, store, create, generate, update, manage, and access one or more activities and/or information associated with the file activity system 100. For example, the activity service 108 may receive, store, create, generate, update, and manage one or more activities associated with a file and/or activity metadata corresponding to the one or more activities associated with the file. In another example, the activity service 108 may provide access to the one or more activities associated with a file and/or activity metadata corresponding to the one or more activities associated with the file. In one case, the client computing device 104, the server computing device 106, and/or an application associated with the client computing device 104 and/or the server computing device 106 may access the activity service 108.

In aspects, the storage platform 130 may communicate with the client computing device 104 and/or the activity service 108. In this regard, the storage platform 130 may retrieve and/or obtain one or more activities associated with one or more files from the activity service 108. In one case, the storage platform 130 may retrieve and/or obtain activity metadata corresponding to the plurality of activities from the activity service 108. In another case, the storage platform 130 may send activity metadata corresponding to the plurality of activities associated with one or more files to the activity service 108 for storage.

Figure 2:
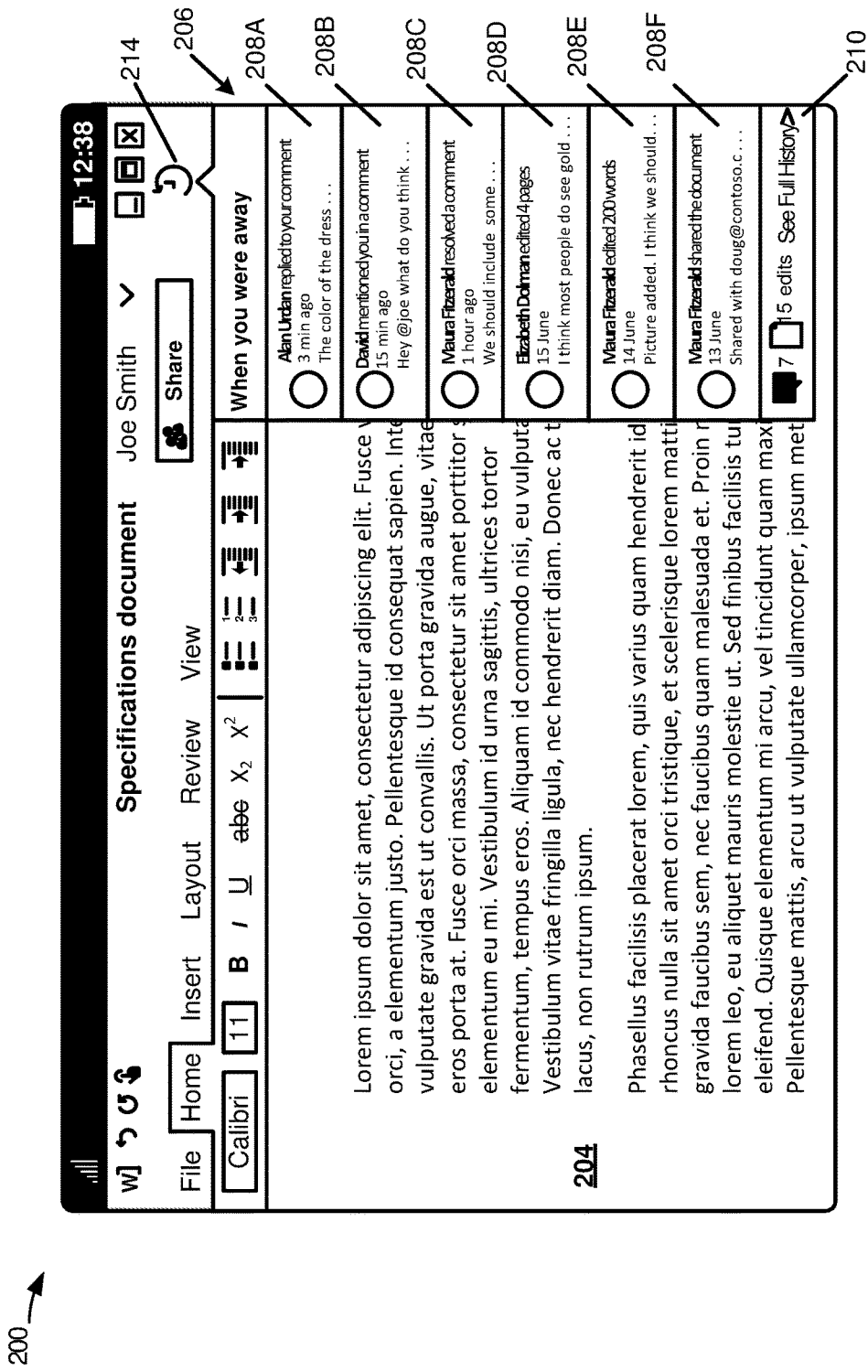
FIG. 2 illustrates one view of a word processing application displayed on a user interface of a client computing device, according to an example aspect.

Referring now to FIG. 2, an example view 200 of an application displayed on a user interface of the client computing device 104, such as a desktop computer, tablet computer or a mobile phone, for example, is shown. The exemplary application, as shown in FIG. 2, is a word processing application. In one example, an application may include any application suitable for collaboration and/or co-authoring such as a word processing application, spreadsheet application, electronic slide presentation application, email application, chat application, voice application, and the like. In one case, a file associated with the application may include a word document, a spreadsheet, an electronic slide presentation, an email, a chat conversation, and the like. As such, an exemplary application may be a word processing application, as illustrated in FIG. 2. In this example, an exemplary file associated with the word processing application may include a word document. As such, an exemplary file activity feed (e.g., the file activity feed associated with the word document) may include a plurality of activities associated with the word document. The plurality of activities may include one or more missed activities that are relevant to a user associated with a user identity of a file.

As illustrated, the exemplary view 200 of the word processing application displayed on the client computing device 104 includes a file 204, a file activity feed 206, a plurality of missed activities 208A-208F, a file activity feed icon 214, and an activity option 210. The plurality of missed activities 208A-208F are exemplary activities of the file activity feed 206. It is appreciated that while FIG. 2 illustrates the plurality of missed activities 208A-208F of the file activity feed 206, the discussion of the plurality of missed activities 208A-208F and the file activity feed 206 is exemplary only and should not be considered as limiting. Any suitable number and/or type of activities of the file activity feed 206 may be displayed on the client computing device 104. Furthermore, while the present disclosure discusses the word processing application, file 204, and file activity feed 206, this is only exemplary and should not be considered limiting. Any number of applications, files, and/or file activity feeds may be utilized in conjunction with the present disclosure.

As illustrated in FIG. 2, the plurality of missed activities 208A-208F of the file activity feed 206 include one or more missed activities associated with the user identity of the file 204. For example, the user associated with the user identity of the file 204 illustrated in FIG. 2 is Joe Smith. In one case, the user identity may be any identifier suitable of identifying a user and/or co-author of the file 204. In one example, the user identity may be the name of the user/co-author (e.g., Joe Smith). As such, in the exemplary example illustrated in FIG. 2, the plurality of missed activities 208A-208F of the file activity feed 206 include one or more missed activities associated with the user Joe Smith. As discussed above, a timestamp associated with the user identity of the file 204 may be identified to determine whether the plurality of activities obtained include one or more missed activities. In this regard, the plurality of missed activities 208A-208F are identified using the timestamp associated with the user Joe Smith of the file 204. For example, the plurality of missed activities 208A-208F include at least some of the activities that occurred while the user Joe Smith was away from the file 204. In one example, the plurality of missed activities 208A-208F may include the activities that occurred since Joe Smith last viewed the file 204. In another example, the plurality of missed activities 208A-208F may include the activities that occurred since Joe Smith last edited the file 204. In yet another example, the plurality of missed activities 208A-208F may include the activities that occurred since Joe Smith last entered the file activity feed 206 of the file 204. In yet another example, the plurality of missed activities 208A-208F may include the activities that occurred since Joe Smith last exited the file activity feed 206 of the file 204. In yet another example, the plurality of missed activities 208A-208F may include the activities that occurred since Joe Smith last closed the file 204. In yet another example, the plurality of missed activities 208A-208F may include a combination of any of the activities that occurred since Joe Smith last viewed the file 204, last edited the file 204, last entered the file activity feed 206 of the file 204, last exited the file activity feed 206 of the file 204, and/or last closed the file 204.

In further examples, the plurality of missed activities 208A-208F may include any number and/or combination of the missed activities described above herein that are determined to be relevant to the user Joe Smith. As discussed above, in one example, determining which missed activities of the one or more missed activities (e.g., the plurality of missed activities 208A-208F) are relevant to the user (e.g., Joe Smith) associated with the user identity includes identifying one or more missed activities that explicitly reference the user associated with the user identity. Missed activities 208A-208C include missed activities that explicitly reference Joe Smith. For example, missed activity 208A includes a response to a comment created by Joe Smith. In another example, missed activity 208B includes an activity directed to Joe Smith. The activity directed to Joe Smith is a mention "Hey @joe . . . " in a comment. In another example, missed activity 208C includes resolving a comment that Joe Smith replied to. As discussed above, in another example, determining which missed activities of the one or more missed activities (e.g., the plurality of missed activities 208A-208F) are relevant to the user (e.g., Joe Smith) associated with the user identity includes identifying one or more missed activities that implicitly reference the user associated with the user identity. Missed activities 208D and 208E include missed activities that implicitly reference Joe Smith. For example, missed activity 208D includes edits to content created by Joe Smith. In another example, missed activity 208E includes edits to content created by Joe Smith. As discussed above, in yet another example, determining which missed activities of the one or more missed activities (e.g., the plurality of missed activities 208A-208F) are relevant to the user (e.g., Joe Smith) associated with the user identity includes identifying one or more missed activities indicated as relevant in one or more user preferences associated with the user identity. Missed activity 208F includes a missed activity indicated as relevant in one or more preferences associated with Joe Smith. In this example, Joe Smith has set a user preference (not illustrated) to be notified when the file 204 has been shared. In this regard, missed activity 208F indicates that the file 204 has been shared and includes information associated with sharing the file (e.g., with whom the filed was shared).

As discussed above, the word processing application displayed on the client computing device 104 includes a file activity feed icon 214 and an activity option 210. In one example, in response to receiving a selection of the file activity feed icon 214, the file activity feed 206 may be displayed within the file 204. In other examples, the file activity feed 206 may be automatically displayed within the file 204, for example, upon opening the file 204. In some cases, the file activity feed 206 is only automatically displayed within the file 204 when one or more missed activities are identified. In this regard, a user/co-author of the file 204 is notified of only those activities that have occurred, and in many cases those activities directly relevant to the user, while the user was away. As such, users can quickly get caught up with relevant changes and/or activities that have happened to and/or around a file while they were away.

Accordingly, an overwhelming amount of data that is distracting, duplicated, cluttered, and difficult to parse may be avoided.

In some examples, the activity option 210 includes options for viewing activities that are not directly displayed within the file activity feed 206. For example, in the example illustrated in FIG. 2, in addition to the missed activities 208A-208F associated with the user Joe Smith, the missed activities include at least an additional 7 comments and 15 edits. Activity option 210 also includes an option to view the full activity history. In some cases, the additional activities not directly displayed within the file activity feed 206 may include missed activities that are determined to be irrelevant to the user (e.g., an edit to content created by another/different co-author). In some cases, the additional activities not directly displayed within the file activity feed 206 may include missed activities that are determined to be relevant to the user, but that are assigned a low priority level, which will be discussed below relative to FIG. 3.

Figure 3:
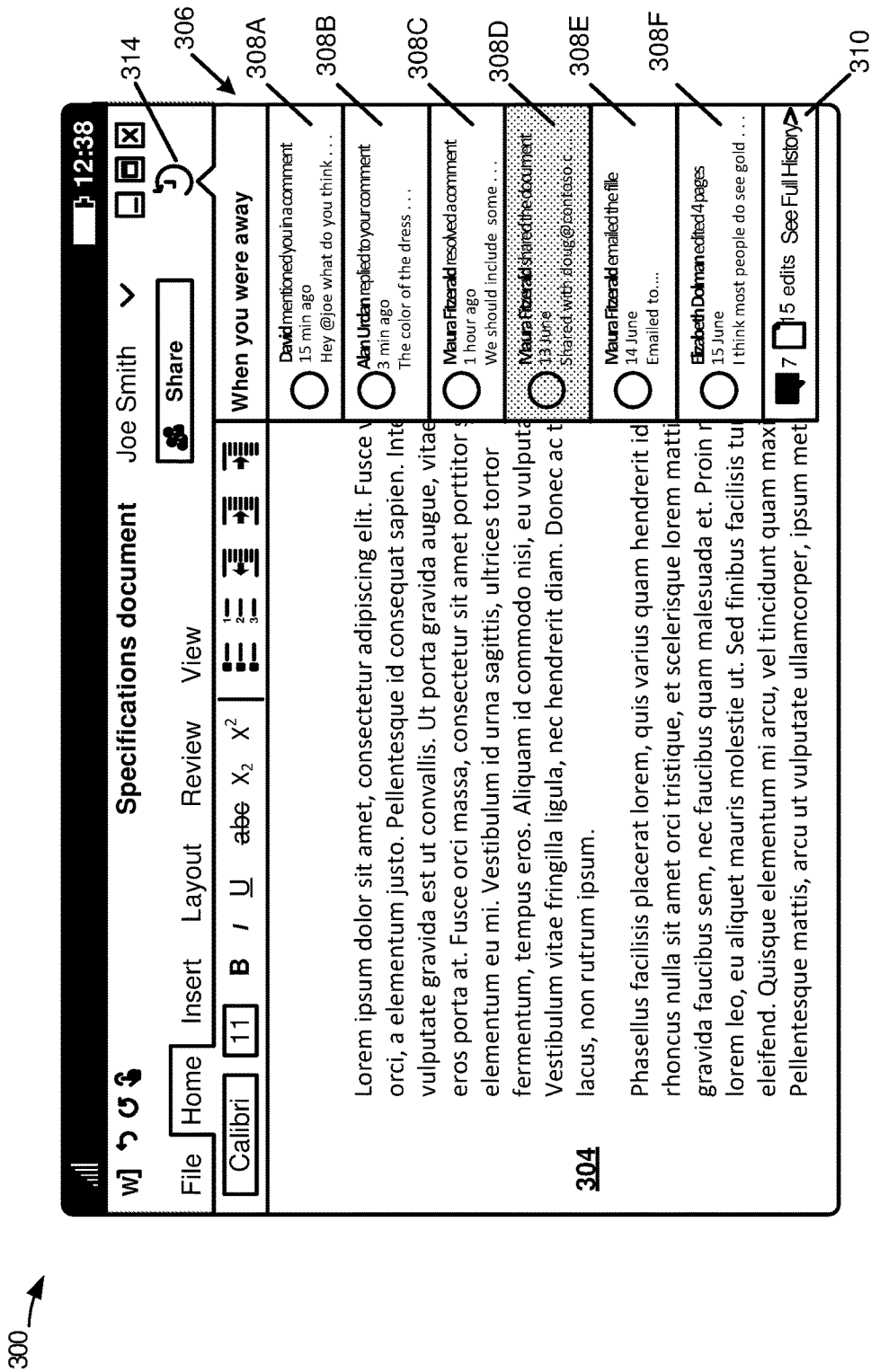
FIG. 3 illustrates one view of a word processing application, according to an example aspect.

Referring now to FIG. 3, an example view 300 of an application displayed on a user interface of the client computing device 104, such as a desktop computer, tablet computer or a mobile phone, for example, is shown. The exemplary application, as shown in FIG. 3, is a word processing application. In one example, an application may include any application suitable for collaboration and/or co-authoring such as a word processing application, spreadsheet application, electronic slide presentation application, email application, chat application, voice application, and the like. In one case, a file associated with the application may include a word document, a spreadsheet, an electronic slide presentation, an email, a chat conversation, and the like. As such, an exemplary application may be a word processing application, as illustrated in FIG. 3. In this example, an exemplary file associated with the word processing application may include a word document. As such, an exemplary file activity feed (e.g., the file activity feed associated with the word document) may include a plurality of activities associated with the word document. The plurality of activities may include one or more missed activities that are relevant to a user associated with a user identity of a file.

As illustrated, the exemplary view 300 of the word processing application displayed on the client computing device 104 includes a file 304, a file activity feed 306, a plurality of missed activities 308A-308F, a file activity feed icon 314, and an activity option 310. The plurality of missed activities 308A-308F are exemplary activities of the file activity feed 306. It is appreciated that while FIG. 3 illustrates the plurality of missed activities 308A-308F of the file activity feed 306, the discussion of the plurality of missed activities 308A-308F and the file activity feed 306 is exemplary only and should not be considered as limiting. Any suitable number and/or type of activities of the file activity feed 306 may be displayed on the client computing device 104. Furthermore, while the present disclosure discusses the word processing application, file 304, and file activity feed 306, this is only exemplary and should not be considered limiting. Any number of applications, files, and/or file activity feeds may be utilized in conjunction with the present disclosure.

As illustrated in FIG. 3, the plurality of missed activities 308A-308F of the file activity feed 306 include one or more missed activities associated with the user identity of the file 304. For example, similar to FIG. 2, the user associated with the user identity of the file 304 illustrated in FIG. 3 is Joe Smith. In one case, the user identity may be any identifier suitable of identifying a user and/or co-author of the file 304. In one example, the user identity may be the name of the user/co-author (e.g., Joe Smith). As such, in the exemplary example illustrated in FIG. 3, the plurality of missed activities 308A-308F of the file activity feed 306 include one or more missed activities associated with the user Joe Smith. As discussed above, a timestamp associated with the user identity of the file 304 may be identified to determine whether the plurality of activities obtained include one or more missed activities. In this regard, the plurality of missed activities 308A-308F are identified using the timestamp associated with the user Joe Smith of the file 304. For example, the plurality of missed activities 308A-308F include at least some of the activities that occurred while the user Joe Smith was away from the file 304. The plurality of missed activities 308A-308F may include any number and/or combination of the missed activities described above herein (e.g., relative to FIG. 2) that are determined to be relevant to the user Joe Smith.

As discussed above, displaying the one or more missed activities (e.g., the plurality of missed activities 308A-308F) determined to be relevant to the user (e.g., Joe Smith) associated with the user identity includes determining an order for displaying the one or more missed activities (e.g., the plurality of missed activities 308A-308F) within the file activity feed 306. For example, the one or more missed activities (e.g., the plurality of missed activities 308A-308F) may be ordered within the file activity feed 306 from a top position to a bottom position based on priority. In this regard, a priority level may be assigned to the one or more missed activities (e.g., the plurality of missed activities 308A-308F). In one case, the priority level may indicate at which position in the file activity feed 306 the plurality of missed activities 308A-308F are displayed. For example, when a high priority level is assigned to a missed activity, the missed activity may be displayed in a more favored position (e.g., a top or higher position) within the file activity feed 306. In another example, when a low priority level is assigned to a missed activity, the missed activity may be displayed in a less favored position (e.g., a bottom or lower position) within the file activity feed 306.

In one case, the priority level may be assigned to the plurality of missed activities 308A-308F based on whether the plurality of missed activities 308A-308F explicitly or implicitly reference the user Joe Smith. For example, a higher priority level may be assigned to activities that explicitly reference the user Joe Smith than activities that implicitly reference the user Joe Smith. In one example, a highest priority level may be assigned to the missed activities directed to the user associated with the user identity. Missed activities 308A-308C include missed activities that explicitly reference Joe Smith. For example, missed activity 308A includes an activity directed to Joe Smith. The activity directed to Joe Smith is a mention "Hey @joe . . . " in a comment. In this case, missed activity 308A is assigned the highest priority level of the plurality of missed activities 308A-308F. As such, missed activity 308A is displayed at the top position within the file activity feed 306. In another example, missed activity 308B includes a response to a comment created by Joe Smith. In another example, missed activity 308C includes resolving a comment that Joe Smith replied to. Missed activities 308B and 308C (e.g., missed activities that explicitly reference Joe Smith) are assigned higher priority levels than missed activity 308F (e.g., a missed activity that implicitly reference Joe Smith). Accordingly, missed activities 308B and 308C are displayed in a higher position than missed activity 308F within the file activity feed 306.

As discussed above, in one case, the priority level is assigned to the plurality of missed activities 308A-308F based on one or more user preferences associated with the user identity. For example, as discussed above, a user may set a preference for receiving notifications based on a type of activity. When a preference is set for receiving a notification of a missed activity of a particular type, this particular type of activity may be assigned a high priority level. Missed activity 308D includes a missed activity indicated as relevant in one or more preferences associated with Joe Smith. In this example, Joe Smith has set a user preference (not illustrated) to be notified when the file 304 has been shared. In this regard, missed activity 308D indicates that the file 304 has been shared and includes information associated with sharing the file (e.g., with whom the filed was shared). As illustrated in FIG. 3, missed activity 308D is assigned a higher priority level than missed activities 308E and 308F and is assigned a lower priority level than missed activities 308A-308C. Accordingly, missed activity 308 is displayed in a higher position than missed activities 308E and 308F and displayed in a lower position than missed activities 308A-308C within the file activity feed 306.

In the example illustrated in FIG. 3, missed activity 308D is highlighted. In some cases, the missed activities indicated as relevant in one or more user preferences associated with the user identity may be highlighted within the file activity feed 306. In this regard, a user can quickly and efficiently identify those activities they indicated as being relevant in one or more user preferences. In other examples, a highest priority level may be assigned to the one or more missed activities indicated as relevant in the one or more user preferences. In this example, the one or more missed activities indicated as relevant in the one or more user preferences may be displayed in a more favored position (e.g., a top or higher position) within the file activity feed 306. In some cases, the missed activities assigned the highest priority level may be highlighted (e.g., rather than displayed in a highest position within the file activity feed 306 as illustrated) to indicate that they are most relevant and/or important to a user (not illustrated). In this regard, a user may quickly identify those missed activities most important and/or relevant to them by simply identifying the highlighted activities within the file activity feed 306.

As discussed above, the priority level may be assigned to the one or more missed activities based on a history of one or more missed activities identified as relevant to the user associated with the user identity. For example, the type of missed activities that are most important and/or relevant to a particular user may be learned over time. Missed activity 308E includes a missed activity of the type "email." In this case, the client computing device 104 and/or the file 304 has learned that missed activities of the type "email" are important and/or relevant to Joe Smith. As such, missed activity 308E is readily displayed within the file activity feed 306. In yet another case, the priority level is assigned to the one or more missed activities based on a combination of one or more user preferences associated with the user identity and a history of one or more missed activities identified as relevant to the user associated with the user identity (not illustrated). In one example, as illustrated in FIG. 3, a higher priority level is assigned to the one or more missed activities based on the one or more user preferences (e.g., missed activity 308D) than based on the history of the one or more activities (e.g., missed activity 308E). In another example, a highest priority level may be assigned to one or more missed activities that are included in the one or more user preferences and identified as relevant in the history of the one or more missed activities (not illustrated). In yet another case, the priority level is assigned to the one or more missed activities based on a combination of whether the one or more missed activities explicitly or implicitly reference the user, one or more user preferences associated with the user identity and a history of one or more missed activities identified as relevant to the user associated with the user identity (not illustrated). It is appreciated that any of the factors relating to relevancy and/or importance described herein may be used alone and/or in any combination to assign a priority level to the one or more missed activities for display within the file activity feed (e.g., 206 and 306).

As discussed above, the word processing application displayed on the client computing device 104 includes a file activity feed icon 314 and an activity option 310. The file activity feed icon 314 and the activity option 310 include the same functionality as the file activity feed icon 214 and the activity option 210 described above relative to FIG. 2.

Figure 4:
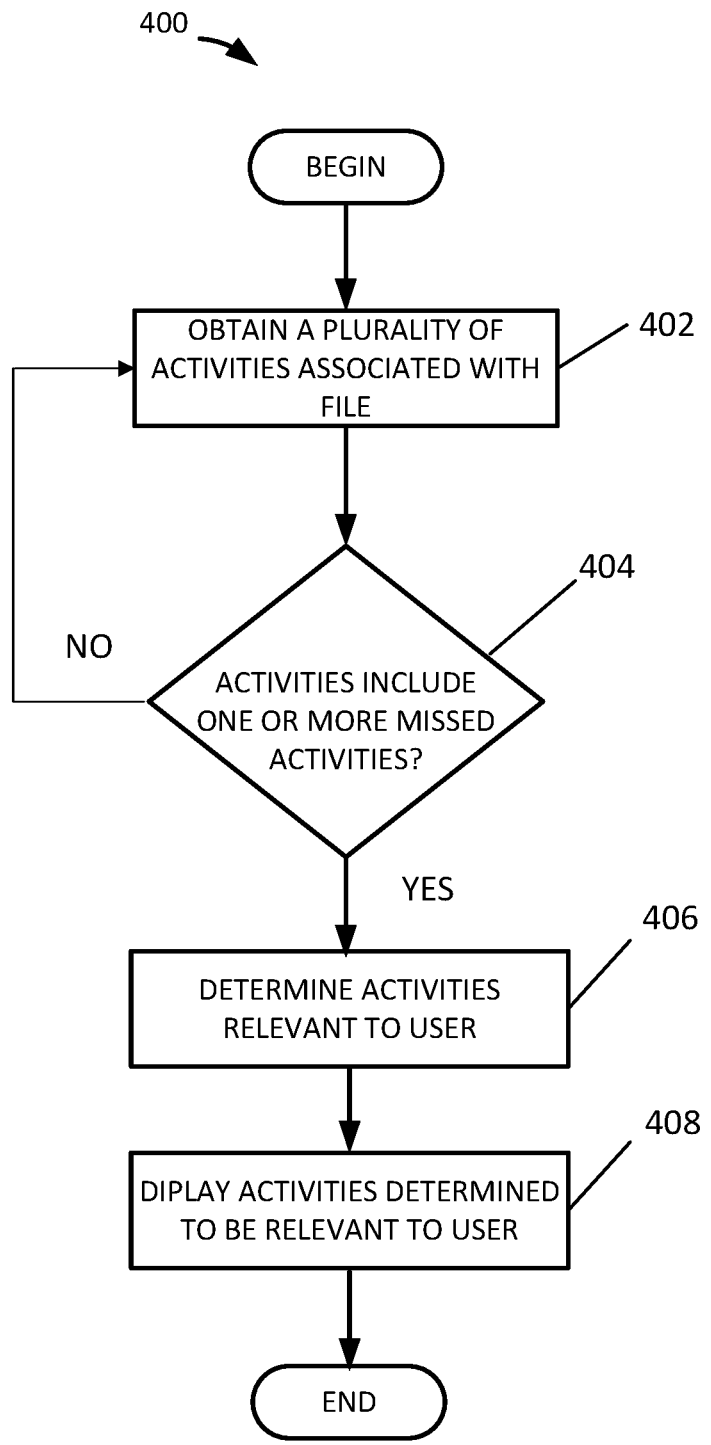
FIG. 4 illustrates an exemplary method for creating a file activity feed for display on a user interface of a client computing device, according to an example aspect.

Referring now to FIG. 4, an exemplary method 400 for creating a file activity feed for display on a user interface of a client computing device, according to an example aspect is shown. Method 400 may be implemented on a computing device or a similar electronic device capable of executing instructions through at least one processor. The file activity feed may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for creating the file activity feed may be utilized by method 400.

Method 400 may begin at operation 402, where data comprising a plurality of activities associated with a file is obtained. In some cases, the data is obtained on a per user/co-author basis. For example, a different file activity feed may be created for each user/co-author of the file. In this regard, the file activity feed may include activities that have occurred while a user/co-author has been away from the file (e.g., one or more missed activities). In some aspects, the data may be obtained from one or more sources. For example, the data may be obtained from at least an activity service, a storage platform and a data store. In some cases, the data may be obtained from a plurality of activity services, storage services and/or data stores.

When data comprising a plurality of activities associated with a file is obtained, flow proceeds to decision operation 404 where it is determined whether the plurality of activities associated with the file include one or more missed activities. In one example, determining whether the plurality of activities associated with the file include one or more missed activities includes at least identifying a timestamp associated with the user identity of the file. In one example, the timestamp includes at least one of a last view time, a last edit time, a last time entering the file activity feed, a last time exiting the file activity feed, and/or a last close time. When it is determined that the plurality of activities associated with the file do not include one or more missed activities, flow proceeds back to operation 402 where a plurality of activities associated with the file are obtained.

When it is determined that the plurality of activities associated with the file include one or more missed activities flow proceeds to operation 406 where it is determined which missed activities of the one or more missed activities are relevant to a user associated with a user identity of the file. In one example, determining which missed activities of the one or more missed activities are relevant to the user associated with the user identity comprises identifying one or more missed activities that explicitly reference the user associated with the user identity. In another example, determining which missed activities of the one or more missed activities are relevant to the user associated with the user identity comprises identifying one or more missed activities that implicitly reference the user associated with the user identity. In yet another example, determining which missed activities of the one or more missed activities are relevant to the user associated with the user identity comprises identifying one or more missed activities indicated as relevant in one or more user preferences associated with the user identity.

At operation 408, the one or more missed activities determined to be relevant to the user associated with the user identity may be displayed within the file activity feed on the user interface of the client computing device. In one case, the one or more missed activities and/or the file activity feed may be displayed within the file associated with the file activity feed. In another case, the one or more missed activities and/or the file activity feed may be displayed next to the contents on a canvas of the file associated with the file activity feed. In one case, the displayed file activity feed facilitates a proactive while you were away experience for a user and/or co-author of the file associated with the file activity feed. In one case, when none of the one or more missed activities are determined to be relevant to the user associated with the user identity, the one or more missed activities (e.g., not determined to be relevant to the user associated with the user identity) may be displayed within the file activity feed. In another case, when none of the one or more missed activities are determined to be relevant to the user associated with the user identity, the file activity feed may not be displayed, or an abbreviated version of the file activity feed may be displayed.

Figure 5:
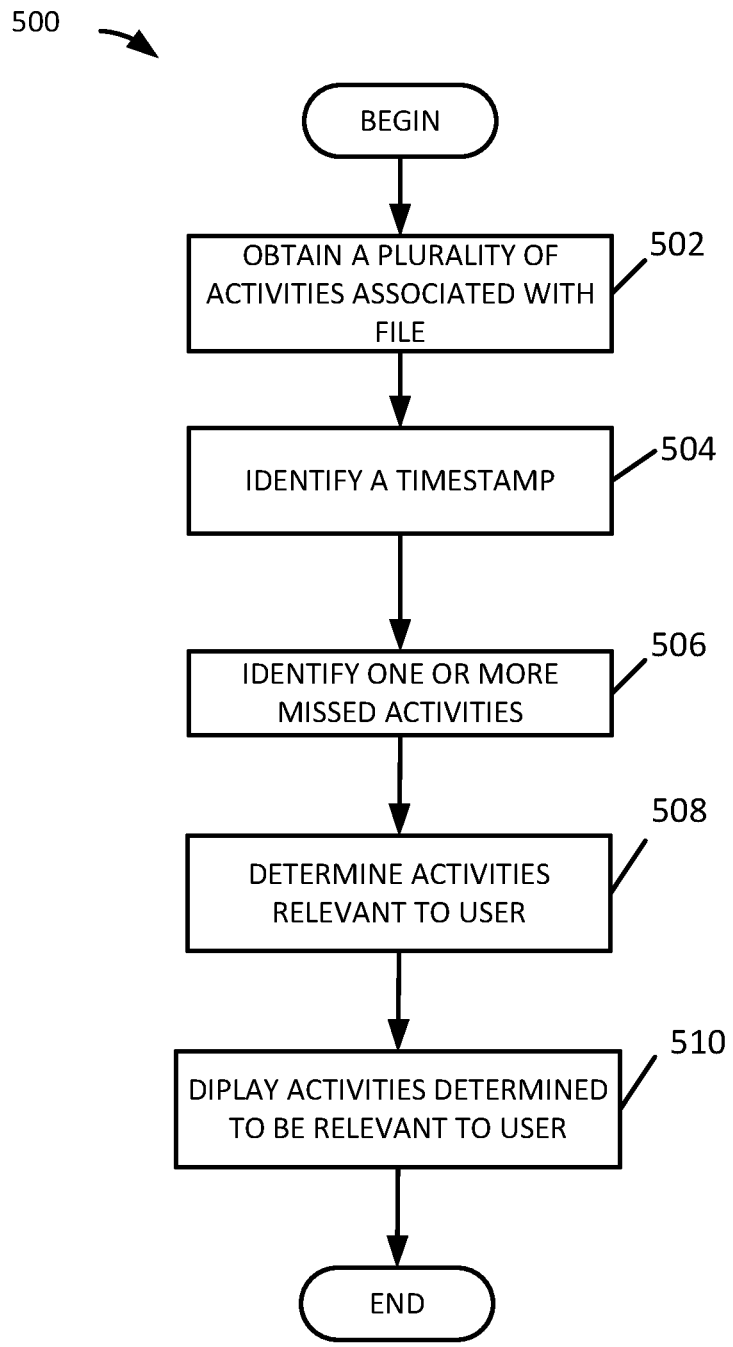
FIG. 5 illustrates an exemplary method for prioritizing one or more missed activities for display within a file activity feed on a user interface of a client computing device, according to an example aspect.

Referring now to FIG. 5, an exemplary method 500 for prioritizing one or more missed activities for display within a file activity feed on a user interface of a client computing device, according to an example aspect is shown. Method 500 may be implemented on a computing device or a similar electronic device capable of executing instructions through at least one processor. Method 500 begins at operation 502 where data comprising a plurality of activities associated with a file is obtained. In some cases, the data is obtained on a per user/co-author basis. For example, a different file activity feed may be created for each user/co-author of the file. In this regard, the file activity feed may include activities that have occurred while a user/co-author has been away from the file (e.g., one or more missed activities). In some aspects, the data may be obtained from one or more sources. For example, the data may be obtained from at least an activity service, a storage platform and/or a data store. In some cases, the data may be obtained from a plurality of activity services, storage services and/or data stores.

When data comprising a plurality of activities associated with a file is obtained, flow proceeds to operation 504 where a timestamp associated with a user identity of the file is identified. The timestamp may include a time associated with a user/co-author being away from the file. For example, the timestamp may include at least one of a last view time of the file, a last edit time of the file, a last time entering the file activity feed, a last time exiting the file activity feed, and a last file close time. The timestamp as described herein may include a date and/or time. For example, the last file close time may include the date and time that a user associated with the user identity closed the file. In another example, the last edit time of the file may include the date and time that a user associated with the user identity last edited the file.

When a timestamp associated with a user identity of the file is identified, flow proceeds to operation 506 where one or more missed activities are identified from the plurality of activities based on the identified timestamp. For example, when the identified timestamp includes the last time a user associated with the user identity opened and viewed the file, the activities that have occurred since the user last opened and viewed the file may be identified as the one or more missed activities. In another example, when the identified timestamp includes the last time a user associated with the user identity edited the file, the activities that have occurred since the user last edited the file may be identified as the one or more missed activities. In another example, when the identified timestamp includes the last time a user entered the file activity feed, the activities that have occurred since the user last entered the file activity feed may be identified as the one or more missed activities. In another example, when the identified timestamp includes the last time a user exited the file activity feed, the activities that have occurred since the user last exited the file activity feed may be identified as the one or more missed activities. In another example, when the identified timestamp includes the last time a user associated with the user identity closed the file, the activities that have occurred since the user last closed the file may be identified as the one or more missed activities. Any combination of the identified timestamps may be used to identify one or more missed activities.

When one or more missed activities are identified from the plurality of activities based on the identified timestamp, flow proceeds to operation 508 where it is determined which missed activities of the one or more missed activities are relevant to a user associated with the user identity. In one example, determining which missed activities of the one or more missed activities are relevant to the user associated with the user identity comprises identifying one or more missed activities that explicitly reference the user associated with the user identity. In another example, determining which missed activities of the one or more missed activities are relevant to the user associated with the user identity comprises identifying one or more missed activities that implicitly reference the user associated with the user identity. In yet another example, determining which missed activities of the one or more missed activities are relevant to the user associated with the user identity comprises identifying one or more missed activities indicated as relevant in one or more user preferences associated with the user identity.

At operation 510, the one or more missed activities determined to be relevant to the user associated with the user identity are displayed within the file activity feed on the user interface of the client computing device. In one example, displaying the one or more missed activities determined to be relevant to the user associated with the user identity comprises determining an order for displaying the one or more missed activities within the file activity feed. Determining an order for displaying the one or more missed activities within the file activity feed may include assigning a priority level to the one or more missed activities. In one example, the priority level may be assigned to the one or more missed activities based on one or more user preferences associated with the user identity. In another example, the priority level may be assigned to the one or more missed activities based on a history of one or more missed activities identified as relevant to the user associated with the user identity. In another example, the priority level may be assigned based on whether the one or more missed activities explicitly or implicitly reference the user associated with the user identity. In one case, the one or more missed activities determined to explicitly reference the user associated with the user identity and indicated as relevant in one or more user preferences associated with the user identity may be displayed within the file activity feed on the user interface of the client computing device.

Figure 6:
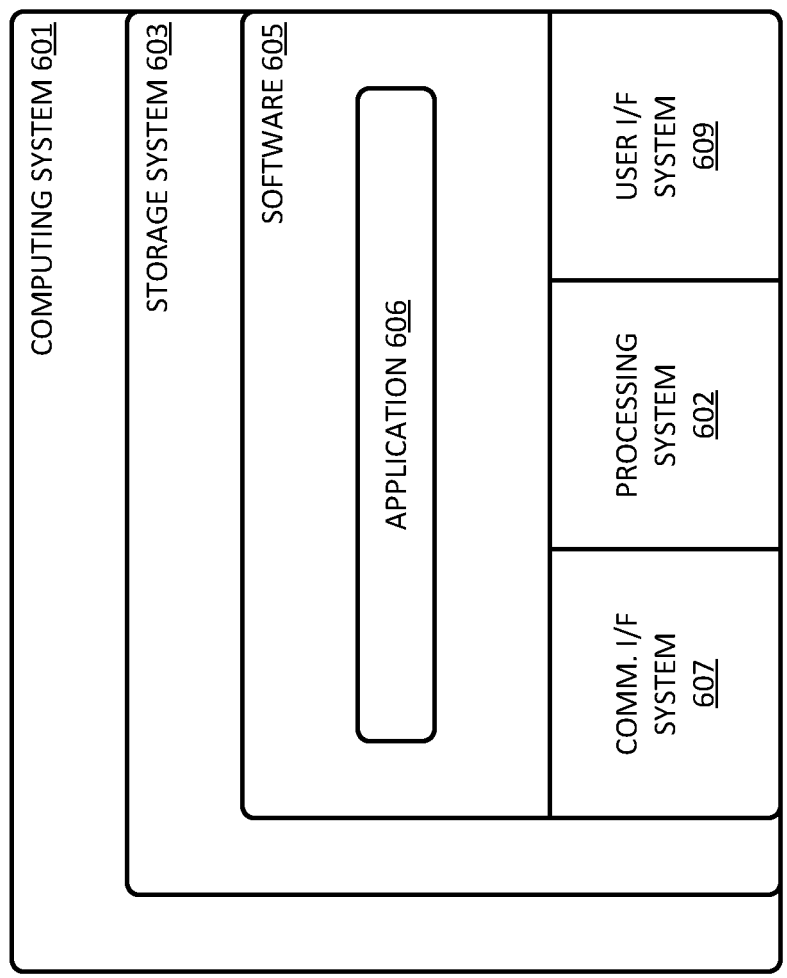
FIG. 6 illustrates a computing system suitable for implementing the enhanced file activity technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes application 606, which is representative of the applications discussed with respect to the preceding FIGS. 1-5, including word processing applications described herein. When executed by processing system 602 to enhance file activity feeds, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced file activity feeds and while you were away experience.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include application 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced file activity feeds. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: at least one processor; and memory encoding computer executable instructions that, when executed by the at least one processor, perform a method for creating a file activity feed for display on a user interface of a client computing device, the method comprising: obtaining data comprising a plurality of activities associated with a file; determining whether the plurality of activities associated with the file include one or more missed activities; when it is determined that the plurality of activities associated with the file include one or more missed activities: determining which missed activities of the one or more missed activities are relevant to a user associated with a user identity of the file; and displaying the one or more missed activities determined to be relevant to the user associated with the user identity within the file activity feed on the user interface of the client computing device. In further examples, determining which missed activities of the one or more missed activities are relevant to the user associated with the user identity comprises identifying one or more missed activities that explicitly reference the user associated with the user identity. In further examples, determining which missed activities of the one or more missed activities are relevant to the user associated with the user identity comprises identifying one or more missed activities that implicitly reference the user associated with the user identity. In further examples, determining which missed activities of the one or more missed activities are relevant to the user associated with the user identity comprises identifying one or more missed activities indicated as relevant in one or more user preferences associated with the user identity. In further examples, determining whether the plurality of activities associated with the file include one or more missed activities comprises at least identifying a timestamp associated with the user identity of the file, and wherein the timestamp includes at least one of a last view time, a last edit time, a last time entering the file activity feed, a last time exiting the file activity feed, and a last close time. In further examples, the one or more missed activities that explicitly reference the user associated with the user identity include at least one of activities directed to the user associated with the user identity, activities in response to activities created by the user associated with the user identity, and reactions to activities created by the user associated with the user identity. In further examples, the one or more missed activities that implicitly reference the user associated with the user identity include at least one of activities that occurred on content created by the user associated with the user identity and activities that occurred on content involving the user associated with the user identity. In further examples, the plurality of activities are associated with the client computing device, and wherein the plurality of activities associated with the client computing device include at least one of messaging, communication activities, comments, email activities, a presentation of the file, a printing of the file, and co-authoring of the file. In further examples, the plurality of activities are associated with a server computing device, and wherein the plurality of activities associated with the server computing device include at least one of receiving a shared file, renaming a file, editing a file, sharing a file, and restoring a file.

Further aspects disclosed herein provide an exemplary method for prioritizing one or more missed activities for display within a file activity feed on a user interface of a client computing device, the method comprising: obtaining data comprising a plurality of activities associated with a file; identifying a timestamp associated with a user identity of the file; identifying one or more missed activities from the plurality of activities based on the identified timestamp; determining which missed activities of the one or more missed activities are relevant to a user associated with the user identity; and displaying the one or more missed activities determined to be relevant to the user associated with the user identity within the file activity feed on the user interface of the client computing device. In further examples, displaying the one or more missed activities determined to be relevant to the user associated with the user identity comprises determining an order for displaying the one or more missed activities within the file activity feed. In further examples, determining an order for displaying the one or more missed activities within the file activity feed comprises assigning a priority level to the one or more missed activities. In further examples, the priority level is assigned to the one or more missed activities based on one or more user preferences associated with the user identity. In further examples, the priority level is assigned to the one or more missed activities based on a history of one or more missed activities identified as relevant to the user associated with the user identity. In further examples, the priority level is assigned to the one or more missed activities based on a combination of one or more user preferences associated with the user identity and a history of one or more missed activities identified as relevant to the user associated with the user identity. In further examples, assigning a priority level to the one or more missed activities comprises assigning a highest priority level to the one or more missed activities directed to the user associated with the user identity. In further examples, the one or more missed activities assigned with a highest priority level are displayed in a top position within the file activity feed.

Additional aspects disclosed herein provide exemplary systems comprising: one or more computer readable storage media; and program instructions stored on the one or more computer readable storage media that, when executed by at least one processor, cause the at least one processor to at least: obtain data comprising a plurality of activities associated with a file; identify a timestamp associated with a user identity of the file; identify one or more missed activities from the plurality of activities based on the identified timestamp; determine which missed activities of the one or more missed activities explicitly reference a user associated with the user identity; determine which missed activities of the one or more missed activities are indicated as relevant in one or more user preferences associated with the user identity; and display the one or more missed activities determined to explicitly reference the user associated with the user identity and indicated as relevant in one or more user preferences associated with the user identity within the file activity feed on the user interface of the client computing device. In further examples, the program instructions further cause the at least one processor to determine an order for displaying the one or more missed activities within the file activity feed based on a priority level assigned to the one or more missed activities. In further examples, the one or more user preferences associated with the user identity include at least one of activity type notifications and a notification frequency.

Techniques for creating and displaying file activity feeds are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of file activity systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   at least one processor; and
   memory encoding computer executable instructions that, when executed by the at least one processor, perform a method for creating a file activity feed for display in a user interface to a file of a client computing device, the method comprising:
   obtaining data comprising at least a first activity and a second activity that are both associated with the file, where the first activity is different than the second activity;
   determining whether the first activity is a missed activity, where the missed activity is an activity associated with the file and that has been performed while the file has an inactive status for a user;
   determining whether the second activity is a missed activity;
   when it is determined that the first activity is a missed activity, determining that the first activity is relevant to the user associated with a user identity of the file;
   when it is determined that the second activity is a missed activity, determining that the second activity is irrelevant to the user associated with the user identity of the file;
   in response to determining that the second activity is irrelevant to the user associated with the user identity of the file, displaying an option indicating that the second activity has been performed within an activity option within the file activity feed without displaying the second activity within the file activity feed; and
   in response to determining that the first activity is relevant to the user associated with the user identity of the file, displaying the first activity within the file activity feed.

2. The system of claim 1, further comprising identifying one or more missed activities that explicitly reference the user associated with the user identity.

3. The system of claim 1, further comprising identifying one or more missed activities that implicitly reference the user associated with the user identity.

4. The system of claim 1, further comprising identifying one or more missed activities indicated as relevant in one or more user preferences associated with the user identity.

5. The system of claim 1, wherein determining whether the first activity is a missed activity comprises at least identifying a timestamp associated with the user identity of the file, and wherein the timestamp includes at least one of a last view time, a last edit time, a last time entering the file activity feed, a last time exiting the file activity feed, and a last close time.

6. The system of claim 2, wherein the one or more missed activities that explicitly reference the user associated with the user identity include at least one of activities directed to the user associated with the user identity, activities in response to activities created by the user associated with the user identity, and reactions to activities created by the user associated with the user identity.

7. The system of claim 3, wherein the one or more missed activities that implicitly reference the user associated with the user identity include at least one of activities that occurred on content created by the user associated with the user identity and activities that occurred on content involving the user associated with the user identity.

8. The system of claim 1, wherein the first activity and the second activity are associated with the client computing device, and wherein the first activity and the second activity associated with the client computing device include at least one of messaging, communication activities, comments, email activities, a presentation of the file, a printing of the file, and co-authoring of the file.

9. The system of claim 1, wherein the first activity and the second activity are associated with a server computing device, and wherein the first activity and the second activity associated with the server computing device include at least one of receiving a shared file, renaming a file, editing a file, sharing a file, and restoring a file.

10. A computer-implemented method for prioritizing one or more missed activities for display within a file activity feed in a user interface to a file of a client computing device, the method comprising:
    obtaining data comprising at least a first activity and a second activity that are both associated with the file, where the first activity is different than the second activity;
    identifying a timestamp associated with a user identity of the file;
    identifying that the first activity and the second activity are missed activities based on the identified timestamp, where the missed activities include an activity associated with the file and that has been performed while the file has an inactive status for a user;
    when it is identified that the first activity is a missed activity, determining that the first activity is relevant to the user associated with the user identity of the file;
    when it is determined that the second activity is a missed activity, determining that the second activity is irrelevant to the user associated with the user identity of the file;
    in response to determining that the second activity is irrelevant to the user associated with the user identity of the file, displaying an option indicating that the second activity has been performed within an activity option within the file activity feed without displaying the second activity within the file activity feed; and
    in response to determining that the first activity is relevant to the user associated with the user identity of the file, displaying the first activity within the file activity feed.

11. The computer-implemented method of claim 10, wherein displaying the first activity within the file activity feed comprises determining an order for displaying the first activity within the file activity feed.

12. The computer-implemented method of claim 11, wherein determining an order for displaying the first activity within the file activity feed comprises assigning a priority level to the first activity.

13. The computer-implemented method of claim 12, wherein the priority level is assigned to the first activity based on one or more user preferences associated with the user identity.

14. The computer-implemented method of claim 12, wherein the priority level is assigned to the first activity based on a history of one or more missed activities identified as relevant to the user associated with the user identity.

15. The computer-implemented method of claim 14, wherein the priority level is assigned to the first activity based on a combination of one or more user preferences associated with the user identity and a history of one or more missed activities identified as relevant to the user associated with the user identity.

16. The computer-implemented method of claim 12, wherein assigning a priority level to the first activity comprises assigning a highest priority level to one or more missed activities directed to the user associated with the user identity.

17. The computer-implemented method of claim 16, wherein the one or more missed activities assigned with a highest priority level are displayed in a top position within the file activity feed.

18. A system comprising:
one or more computer readable storage media; and
program instructions stored on the one or more computer readable storage media that, when executed by at least one processor, cause the at least one processor to at least:
obtain data comprising at least a first activity, a second activity and a third activity that are associated with a file, where the first activity is different than the second activity and the third activity;
identify a timestamp associated with a user identity of the file;
identify that the first activity, the second activity and the third activity are missed activities based on the identified timestamp, where the missed activities include an activity associated with the file and that has been performed while the file has an inactive status for a user;
when it is determined that the first activity is a missed activity, determine that the first activity explicitly references the user associated with the user identity;
when it is determined that the second activity is a missed activity, determine that the second activity is indicated as relevant in one or more user preferences associated with the user identity;
when it is determined that the third activity is a missed activity, determine that the third activity is irrelevant to the user associated with the user identity of the file;
in response to determining that the first activity explicitly references the user associated with the user identity, display the first activity within a file activity feed in a user interface to the file of a client computing device;
in response to determining that the second activity is indicated as relevant in one or more user preferences associated with the user identity, display the second activity within the file activity feed; and
in response to determining that the third activity is irrelevant to the user associated with the user identity of the file, display an option indicating that the third activity has been performed within an activity option within the file activity feed without displaying the third activity within the file activity feed.

19. The system of claim 18, wherein the program instructions further cause the at least one processor to determine an order for displaying the first activity and the second activity within the file activity feed based on a priority level assigned to the first activity and the second activity.

20. The system of claim 18, wherein the one or more user preferences associated with the user identity include at least one of activity type notifications and a notification frequency.

* * * * *